United States Patent Office 3,041,457
Patented June 26, 1962

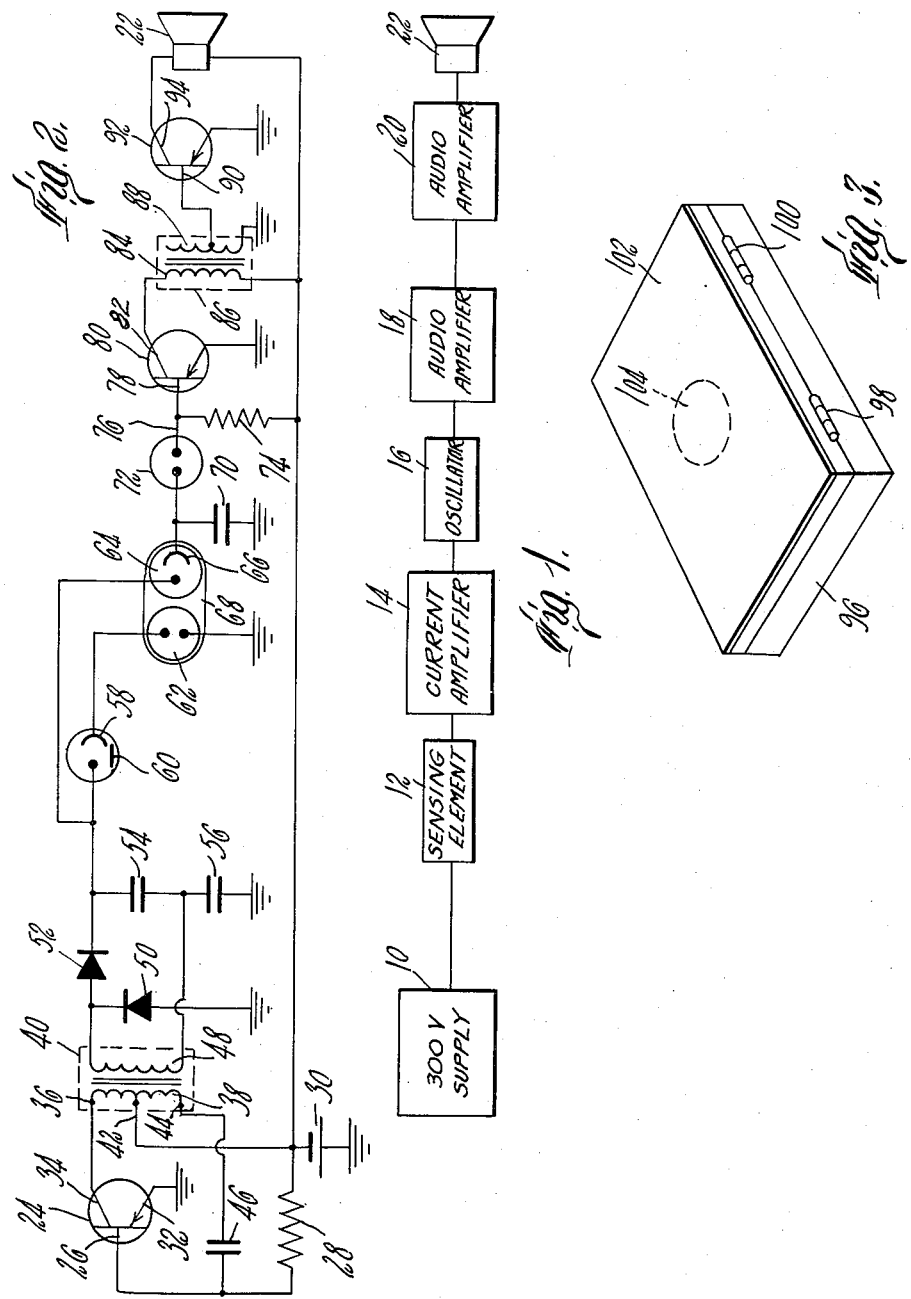

3,041,457
RADIATION DETECTION APPARATUS
James A. Wall, Somerville, Mass., assignor to Controls for Radiation, Inc., Cambridge, Mass., a corporation of Massachusetts
Filed July 27, 1959, Ser. No. 829,652
11 Claims. (Cl. 250—83.3)

This invention relates to detection devices and more particularly to an improved radiation detection device that is particularly sensitive to radiations such as alpha, beta, gamma, X-radiation and neutrons and the like.

There is an increasing awareness and concern relative to the exposure to and handling of certain materials due to the potential dangers from certain types of radiation associated with such materials. In order to properly safeguard individuals that may be exposed to possibly dangerous levels of radiation it is imperative that there be provided means for warning each person of the imminent danger. There are certain devices available, such as Geiger-Mueller counters, which are sensitive to potentially dangerous levels of radiation. However such devices are not suitable for warning use as they tend to saturate at high radiation levels, are not mechanically rugged, and deteriorate from prolonged use or overexposure to radiation. Also such devices are quite expensive. A less expensive type of radiation detection device is a badge which is composed of radiation sensitive materials which are arranged to store the effects of radiation so that it can be tested at a later time to determine the extent of exposure to harmful radiation. Such devices, of course, are not the complete answer to the problem as there is no immediate visual or audible indication of the danger from radiation and an injurious dosage may be accumulated before it is possible to check the badge.

Accordingly it is an object of this invention to provide an improved radiation detecting device suitable for affording substantially immediate indication of the presence of harmful nuclear radiation.

Another object of the invention is to provide an inexpensive and compact nuclear radiation sensing device suitable for individual use which is capable of providing a warning signal in response to sensed radiations.

Still another object of the invention is to provide a compact radiation sensing device which gives a substantially immediate alarm signal of a value which is a function of the magnitude of the radiation to which it is subjected.

A further object of the invention is to provide improved radiation sensing means suitable for use in a compact and inexpensive radiation detector.

The invention utilizes a solid-state type of radiation detector as a sensing element. This element is capable of reliably indicating the magnitude of a radiation level and is arranged for in cooperation with a suitable indicating element in an inexpensive and compact relationship. Suitable detector materials include such semiconductor materials as cadmium sulfide and cadmium selenide crystals. Another sensing element suitable for use includes a photoconductive cell disposed in cooperating relationship with a high-density phosphor having an output fluorescence to match the cell's spectral response, a high quantum efficiency and relatively long decay time (preferably in excess of one microsecond). The addition of the phosphor material reduces certain problems associated with crystal selection and also enables greater sensitivity when both the phosphor and the crystal are responsive to the radiation being sensed.

Where a phosphor is not used, the detector material may, in general, be any semiconductor material the conductivity of which significantly changes under nuclear or X-radiation of energy greater than 10 kev. Cadmium selenide is the presently preferred material as it exhibits a suitably rapid response to significant radiation levels and produces a useable change in output signal level. The available current output from such materials in the presence of significant amounts of radiation is generally so small (in the order of $10^{-8}$ amperes) that a current amplifying device must be utilized in order to provide a suitable signal for operation of the associated equipment. The current amplifier utilized in the preferred embodiment includes an inert-gas filled tube which is connected in series with the radiation sensing element and which is closely associated with a photo-conductor device similar to the detecting element. This amplifying arrangement provides a current gain factor in the order of one hundred. The output of the current amplifier is applied as desired to suitable indicating apparatus. In the preferred embodiment the current amplifier output is applied to a relaxation oscillator arranged so that the frequency of the output signal from the oscillator is dependent upon the magnitude of the current applied to the oscillator. The oscillator signal is then amplified and applied to a suitable loudspeaking device to provide a warning signal in the presence of radiation which has a frequency dependent upon the radiation level to which it is exposed. The invention may be used to provide protection against overexposure to X-rays as well as being used for protection against excessive exposure to gamma radiation levels and the like. It reliably provides an immediate warning when exposed to radiation levels below 1 r./hr. and up to over 5000 r./hr. without saturation. The preferred embodiment which utilizes transistorized amplifiers and power supply, can easily be packaged within a volume smaller than that occupied by an ordinary package of cigarettes and hence is particularly useful as a radiation warning device for individual use. The components utilized are commercially available and are comparatively inexpensive so that a sturdy and reliable radiation detector can be manufactured in quantity at very low cost, thus providing a compact detection device suitable for general and widespread individual use and fulfilling an increasingly urgent need for such protecting devices.

Other objects and advantages of the invention will be seen as the following description of a preferred embodiment thereof progresses in conjunction with the drawing, in which:

FIG. 1 is a block diagram of the circuitry according to the preferred embodiment of the invention;

FIG. 2 is a schematic diagram of that circuitry; and

FIG. 3 is a perspective view of the case in which the circuitry of FIG. 2 may be mounted.

As indicated in FIG. 1 in blockform the preferred embodiment of the invention includes a three-hundred-volt supply unit 10 which supplies the necessary operating potential to a radiation sensing element 12 and the subsequent oscillator and amplifying circuitry. The output of the sensing element in the form of an electric current of very low magnitude is applied to a current amplifier 14 which amplifies the current output of the sensing unit sufficiently for reliable operation of oscillator 16. Two stages 18, 20 of amplification are provided and the output of stage 20 is utilized to operate an audible sound producing element or loudspeaker 22. The sound produced by the loudspeaker 22 varies in frequency in accordance with the magnitude of the radiation to which the sensing element 12 responds. Other types of indicating devices, such as a lamp or a meter, for example, may be utilized if desired.

The schematic diagram of FIG. 2 shows elements of this embodiment in greater detail.

The voltage supply unit 10 comprises transistor 24 which is connected in grounded emitter configuration. The base electrode 26 of the transistor is connected through a resistance 28 to the negative terminal of a 6.5 volt battery 30. The emitter electrode 32 is grounded and the collector electrode 34 is connected to one terminal 36 of a center tapped primary winding 38 of a transformer 40. The center tap 42 of the primary is connected to the negative terminal of the voltage source and the other terminal 44 of the primary winding is connected through a capacitor 46 to the base electrode 26.

The secondary winding 48 of the transformer is connected to a conventional voltage doubler circuit which includes diodes 50 and 52 and capacitors 54 and 56. This combination of a transistor oscillator having feedback from collector electrode to base electrode with the voltage doubler circuit provides a compact voltage supply unit having a nominal output voltage level of +300 volts.

The sensing element 12 comprises a cadmium selenide photo sensitive element 58 and a thallium activated cesium iodide phosphor 60 which are disposed in optically coupled relationship. This combination is sensitive to significant radiation in a manner such that the resistive characteristics of the cadmium selenide element change upon exposure of the unit to radiation. The sensing element is encased in a material opaque to visible light which is adapted to pass only the types of radiation that are to be sensed and voltage from unit 10 is applied to this sensing element through appropriate connections. As both the photosensitive material and the phosphor are sensitive to the significant radiations this arrangement enables a substantial augmented change in the characteristic of the semiconductor material. Certain other semiconductor materials may also be used, alone if sensitive to the significant type or types of radiation, or in combination with a suitable radiation sensitive phosphor in which case the semiconductor element need only be sensitive to the radiation output of the phosphor further provided that the change in the semiconductor characteristics is of sufficient magnitude to be useful at the radiation levels of concern.

The output of the sensing element is applied to the current amplifier 14 which includes a neon tube 62, which is connected in series with the sensing element 12, and a photocell 64. The light sensitive element 66 of cell 64 is oriented so that it is exposed to any glow emanating from the neon tube and the combination is encased in an opaque material 68 so that extraneous radiations cannot affect the combination. The reduced resistance of the cadmium selenide element 58 when the sensing element 12 is exposed to gamma radiation of about 10 r./hr., for example, produces a current which may be in the order of only $10^{-8}$ amperes but this minute current causes an increased voltage drop across the neon tube 62 that is sufficient to cause a slight glow (not visible to the naked eye) in the tube. The resultant glow of the neon tube 62, as sensed by the cooperating cell 64, causes a marked reduction in the resistance of that cell and an increase in the current flow through the circuit. This amplifying arrangement provides a current gain factor in the order of 100.

The photoconductor material may be mounted with the glow tube envelope in a still more compact arrangement and by proper choice of the type of gases in the tube and its pressure, the electrode spacing and the photoconductor material a variety of current amplification factors can be obtained.

It will be noted that these current amplifier arrangements provide a simple and compact device having substantial current gain and high input impedance—such characteristics enable its use in high voltage circuits in a manner similar to conventional electron tube arrangements. It has distinct advantages over such arrangements however as no filament supply and other specialized circuitry that must be associated with such arrangements are required.

The output of the current amplifier is applied to the relaxation oscillator 16 which includes a capacitor 70 and a neon tube 72. In operation the capacitor is charged until the voltage applied across the neon tube reaches the tube's breakdown voltage at which point the capacitor is discharged through the tube. A resistor 74 is connected between the output line 76 of the oscillator and the voltage supply. The resultant pulse output from the oscillator is applied to the base electrode 78 of an amplifying transistor 80 in the first stage 18 of amplification and drives the emitter-collector output circuit of the transistor into conducting state to effect an amplification of the oscillator output. The amplified signal from the collector electrode 82 of the transistor is applied to the primary winding 84 of coupling transformer 86. The signal, inverted in polarity by the transformer action, is applied from the secondary winding 88 to the base electrode 90 of a second transistor 92 which is connected in grounded emitter configuration as is transistor 80. The signal applied to the base is effective to turn on that transistor and the transistor acts to provide an amplified signal at the collector electrode 94. The collector electrode is connected to the loudspeaker circuit 22 and thus the amplified signal is applied thereto for providing an audible alarm.

This entire circuitry may be easily enclosed within a case 96 as shown in FIG. 3, having dimensions of approximately 2" x 3" x ⅝". The case may be hinged as indicated at 98, 100 so that easy access to the component of the circuitry is assured. The diaphragm of the loudspeaker 22 may be a resilient material such as metal, plastic, impregnated fiber materials and the like disposed to form one side 102 of the case 96. In such an arrangement the magnet element 104 of the loudspeaker assembly, indicated by dotted lines in FIG. 3, may be of a type similar to that used in an ordinary headphone set, for example, and is secured to the diaphragm by appropriate means. Thus the assembly provides a sturdy and compact unit which provides a clearly audible and subtsantially immediate warning of exposure to a potentially dangerous radiation level. The detector provides the feature that the frequency of the audible signal generated by the described circuit is a function of the magnitude of radiation to which the sensing element is exposed and the frequency limits of that signal may be easily varied by adjusting the size of capacitor 70. The circuitry is capable of reliable operation at radiation levels in the order of 5000 r./hr. and above without saturation and thus provides distinct advantages over radiation detection devices known in the prior art which saturate at much lower radiation levels. This is due in part to the fact that the resistance characteristic of the cadmium selenide sensing element is capable of varying as a function of the impinging radiation throughout this range and also to the fact that the characteristics of the sensing element tend to limit the output current to a value which dies not overload the following circuitries even at high radiation levels. The voltage supply 10 has also been designed so that the output voltage drops as increased current is drawn, thus providing an additional control over the current that is passed by the sensing element.

Suitable component values for use in this circuit are as follows.

| Element: | Type |
| --- | --- |
| Transistors 24, 80, 92 | CK 722. |
| Diodes 50, 52 | SR 500. |
| Resistor 28 | 47,000 ohms. |
| Resistor 74 | 270,000 ohms. |
| Capacitor 46 | 1 microfarad. |
| Capacitor 54, 56 | 0.01 microfarad. |
| Capacitor 70 | 200 micromicrofarads. |
| Transformer 40 | Argonne AR 147. |

Transformer 86 _____ Argonne TR 96.
Voltage source 30 _____ 6.5 volt battery.
Photocell 58 _____ Clairex CL-3.
Photocell 64 _____ Clairex CL-407.
Neon tubes 62, 72 _____ Ne 2.

Various obvious modifications of the described circuit will naturally occur to those practicing the invention. For example, while PNP transistors have been shown it will be understood that with simple modifications of the circuitry NPN transistors may be utilized. Further, when the sensing element is used with a meter having a 0-50 microampere sensitivity, for example, the output from photocell 64 can be fed directly to the meter. Thus while there has been shown and described herein a preferred embodiment of the invention it will be understood that the invention is not intended to be limited thereto or to details thereof and departures may be made therefrom within the spirit and scope of the invention as defined in the claims.

I claim:

1. A compact radiation sensing and warning device suitable for personal use including a sensing element comprising a semiconductor material having a resistance of varying value dependent upon the magnitude of radiation impinging thereon and a phosphor element disposed in optically coupled relationship with said semiconductor material, said semiconductor material having a quantum efficiency greater than one and said semiconductor material and said phosphor element being encased in a material opaque to visible light, means for rendering said sensing element responsive to only certain selected types of radiation, a voltage supply connected to said semiconductor material so as to provide an output signal from said material of a magnitude dependent upon the radiation impinging upon said sensing element, signal amplifying means for amplifying said output signal, sound producing means including an electromagnetic member responsive to the amplified signal for providing substantially immediate indication when said sensing device is exposed to a significant level of radiation of said selected types, and a case for packaging the device, said case including a wall portion disposed in cooperating relationship with said electromagnetic member as a diaphragm for producing an audible sound indicative of magnitude of the selected types of radiation impinging on said sensing element.

2. The radiation sensing device as claimed in claim 1 wherein said semiconductor material is a cadmium selenide crystal and said phosphor is thallium activated cesium iodide.

3. The radiation sensing device as claimed in claim 1 wherein said amplifying means includes an inert gas filled glow tube connected in series with said semiconductor material, said glow tube having a plurality of electrode elements and being adapted to produce radiations when said electrodes are subjected a voltage difference, and a solid state element having a resistance characteristic responsive to radiation generated by said glow tube disposed in optically coupled relationship with said elements.

4. A compact radiation sensing and warning device suitable for personal use including a voltage supply, a sensing element comprising a cadmium selenide crystal having a resistance characteristic of varying value dependent upon the magnitude of radiation impinging thereon encased in a material opaque to visible light, means for rendering said crystal responsive to only certain selected types of radiation, said crystal being connected in series with said voltage supply for providing an electric current of a magnitude dependent upon the radiation impinging upon said crystal, current amplifying means comprising an inert gas-filled glow tube connected in series with said crystal, said glow tube having a plurality of electrode elements and being adapted to produce radiations under the influence of a voltage across said electrodes and a semiconductor material having a resistance characteristic responsive to radiations generated by said glow tube disposed in optically coupled relationship with said electrodes and connected in series with said voltage supply for effecting an amplification of the current from said crystal, and indicating means responsive to the amplified current from said semiconductor material for providing substantially immediate indication when said sensing device is exposed to a significant level of radiation of said selected types.

5. The radiation sensing device as claimed in claim 4 wherein said sensing element includes a thallium activated cesium iodide phosphor element sensitive to said selected types of radiation disposed in optically coupled relationship with said cadmium selenide crystal.

6. The radiation sensing device as claimed in claim 4 wherein said indicating means includes a relaxation oscillator responsive to said amplified current comprising an inert gas filled glow tube connected in series with said amplifier and a capacitor, said capacitor being adapted to be repetitively charged to the breakdown voltage of said tube by said amplified current for producing an output signal of a frequency dependent upon the magnitude of said amplified current, and sound means associated with said oscillator for providing an audible sound varying in frequency dependent upon the magnitude of the selected types of radiation impinging upon said sensing element as an indication of the magnitude of such radiations.

7. A current amplifier adapted to be associated with a current source which provides electric currents in the order of $10^{-8}$ amperes for the amplification of such currents comprising an inert gas filled glow tube connected in series with said current source, said glow tube having a plurality of electrodes and being adapted to produce radiation when said electrodes are subjected to a voltage difference, a semiconductor material having a resistance characteristic responsive to radiations generated by said glow tube disposed in optically coupled relationship with said electrodes and a voltage source connected in series with said semiconductor material, the combination being adapted to provide an effective amplification of the current from said current source.

8. The current amplifier as claimed in claim 7 wherein said glow tube is filled with neon gas and said semiconductor material includes a cadmium selenide crystal.

9. A compact radiation sensing and warning device suitable for personal use comprising a voltage supply, a sensing element comprising a cadmium selenide crystal and a thallium activated cesium iodide phosphor disposed in optically coupled relationship with said crystal, said crystal and said phosphor being encased in a material opaque to visible light said sensing element having a resistance characteristic of varying value dependent upon the magnitude of radiation impinging thereon, means for rendering said sensing element responsive to certain types of radiation only, said sensing element being connected in series with said voltage supply so as to provide an electric current output of a magnitude dependent upon the radiation impinging upon said element, current amplifying means comprising in combination a neon tube connected in series with said sensing element, said neon tube having a plurality of electrodes and being adapted to produce radiation when said electrodes are subjected to a voltage difference, and a semiconductor material having a resistance characteristic which varies in response to the radiations produced by said neon tube disposed in optically coupled relationship with said electrodes and connected in series with said voltage supply, said combination providing, as an output current, an effective amplification of the current output from said sensing element, a relaxation oscillator responsive to said amplified current comprising a second neon tube connected in series with said current amplifier and a capacitor, said capacitor being adapted to be repetitively charged to the breakdown voltage of said tube by said amplified current so that said oscillator produces an output signal of a frequency dependent upon the magnitude of said amplified current, output signal amplifying means, an electromagnetic sound producing means responsive to said amplified oscillator output signal and a case adapted to contain the above-mentioned elements, said case including a wall portion disposed as the diaphragm member of said sound producing means, said radiation sensing device being adapted to produce an audible sound of varying frequency as an indication of the magnitude of radiation impinging on said sensing element.

10. A compact radiation sensing and warning device suitable for personal use including a voltage supply having an output voltage of decreasing magnitude as the current drawn therefrom increases, a crystal sensing element including a high quantum efficiency photoconductor and a phosphor disposed in intimate optically coupled relationship having a resistance characteristic capable of varying as a function of the magnitude of impinging radiation over the range 0–5000 r./hr., said photoconductor and said phosphor being encased in a material opaque to visible light means for rendering said crystal responsive to only certain selected types of radiation, said crystal being connected in series with said voltage supply for providing an electric current output of a magnitude dependent upon the radiation impinging upon said crystal, current amplifying means comprising an inert gas-filled glow tube connected in series with said crystal, said glow tube having a plurality of electrode elements and being adapted to produce radiations under the influence of a voltage across said electrode elements and a semiconductor material having a resistance characteristic responsive to radiations generated by said glow tube disposed in optically coupled relationship with said electrodes and connected in series with said voltage supply for effecting an amplification of the current output from said crystal, and indicating means responsive to the amplified current from said semiconductor material for providing substantially immediate indication when said sensing device is exposed to a significant level of radiation of said selected types.

11. A compact radiation sensing and warning device suitable for personal use comprising a case of a size suitable for carrying in the user's pocket and including a voltage supply having an output voltage of decreasing magnitude as the current drawn therefrom increases, a sensing element having a resistance characteristic which varies as a direct function of the magnitude of impinging radiation over the range of 0–5000 r./hr., said sensing element including a photoconductor material having a quantum efficiency greater than one and a phosphor disposed in intimate optically coupled relationship and encased in a material opaque to visible light means for rendering said sensing element responsive to only selected types of radiation, said sensing element being connected in series with said voltage supply for providing an electric current output of a magnitude dependent upon the radiation impinging on said sensing element, means responsive to the electric current output to provide a signal varying in frequency as a function of the magnitude of the current and audible sound producing means including an electromagnetic member responsive to said signal of varying frequency and a portion of the wall of said case disposed for cooperation with said electromagnetic member as a diaphragm such that audible sound indicative of the magnitude of the radiation of the selected types that is impinging on the sensing element is produced, said voltage supply, sensing element, signal responsive means and electromagnetic member being mounted within said case.

References Cited in the file of this patent

UNITED STATES PATENTS

| | | |
|---|---|---|
| 2,650,309 | Webb et al. | Aug. 25, 1953 |
| 2,670,441 | McKay | Feb. 23, 1954 |
| 2,747,104 | Jacobs | May 22, 1956 |
| 2,768,308 | Schultz | Oct. 23, 1956 |
| 2,839,678 | De Witz | June 17, 1958 |
| 2,867,727 | Welker et al. | Jan. 6, 1959 |
| 2,885,562 | Marinace et al. | May 5, 1959 |
| 2,899,560 | Nemet | Aug. 11, 1959 |
| 2,904,696 | Elliott et al. | Sept. 15, 1959 |
| 2,942,110 | Lehovec | June 21, 1960 |

FOREIGN PATENTS

| | | |
|---|---|---|
| 531,515 | Belgium | Feb. 28, 1955 |